Jan. 13, 1953  F. W. HOLT, JR., ET AL  2,625,287
APPLICATION OF THERMOPLASTIC TAPE
Filed March 14, 1950  6 Sheets-Sheet 1

Inventors
FREDERICK W. HOLT, JR.,
DAVID E. BENCH AND
WALTER ERNST
By Morechal & Biebel
ATTORNEYS Patented Jan. 13, 1953

2,625,287

UNITED STATES PATENT OFFICE 2,625,287

APPLICATION OF THERMOPLASTIC TAPE

Frederick W. Holt, Jr., Troy, David E. Bench, Trotwood, and Walter Ernst, Dayton, Ohio, assignors to The Brown-Bridge Mills, Inc., Troy, Ohio, a corporation of Ohio Application March 14, 1950, Serial No. 149,574

16 Claims. (Cl. 216—30)

This invention relates to apparatus for use in the application of sealing tape having a thermoplastic coating thereon to a series of successive articles to be taped or sealed.

More specifically the invention relates to apparatus adapted for use in continuous taping operations such as the production of cartons of corrugated board or like operations wherein the tape having a thermoplastic adhesive coating thereon is applied from a roll or other continuous supply source to successive articles having joints or other surface portions requiring sealing or reinforcement, and the invention is directed particularly to tape applying apparatus of the character disclosed in the copending application of Holt et al., Serial No. 39,546 filed July 19, 1948, and assigned to the same assignee as this application, now Patent No. 2,538,520 issued January 16, 1951.

One of the principal objects of the present invention is the provision of effective adjustable control over the heating conditions affecting the adhesive coating of the tape in apparatus of the above character to assure substantially uniform heating and softening of the coating for proper adhesion.

An additional object is to provide for quick and easy adjustment of the apparatus to accommodate tape of different widths in accordance with a particular taping operation.

It is also an object of the invention to provide simple and effective controls for indicating to the operator of the apparatus any failure in the heating system and also for indicating when the tape supply is nearly exhausted in order to prevent operation of the machine without tape and the resulting objectionable deposit of adhesive on parts of the apparatus which normally engage the uncoated tape surface.

Other objects and advantages of the invention will be apparent from the following description, the accompanying drawings and the appended claims.

Figures 1, 2:
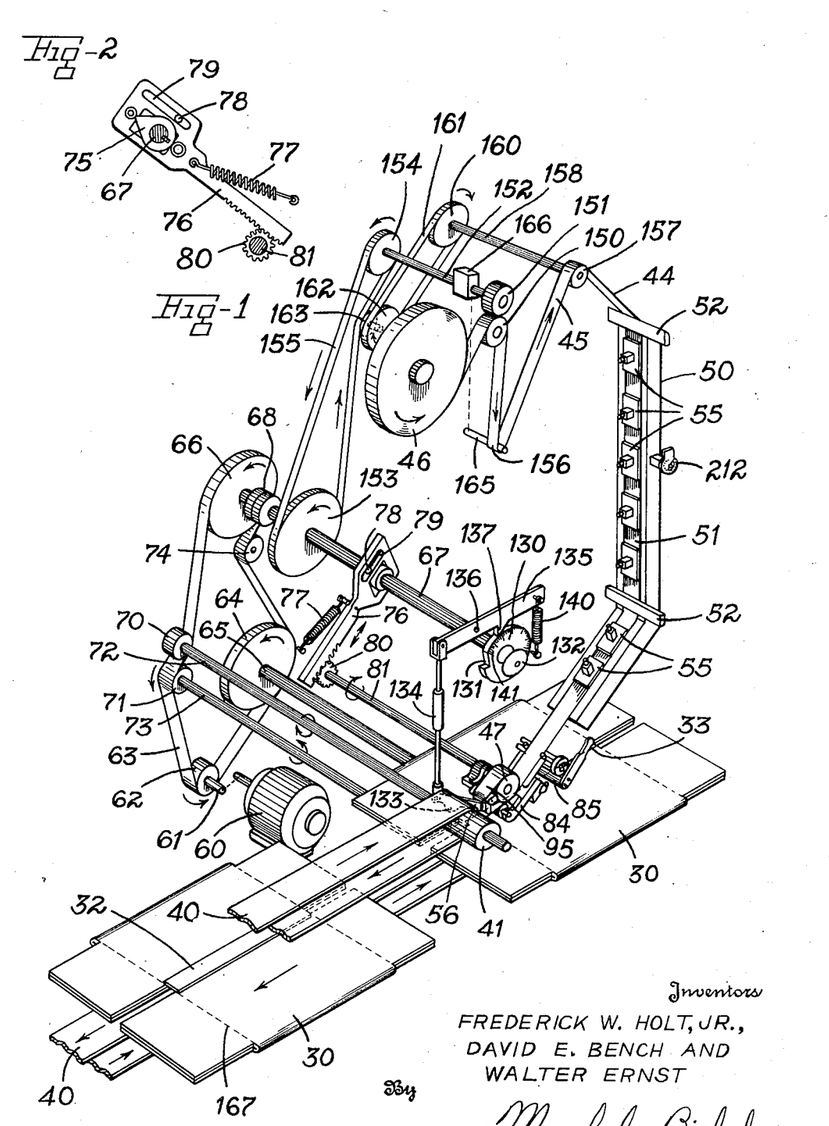
Fig. 1 is a diagrammatic view in the nature of a perspective view of a tape applying apparatus in accordance with the invention.
Fig. 2 is a detail view showing the cam and rack for actuating the tape feeding mechanism.
Figure 3:
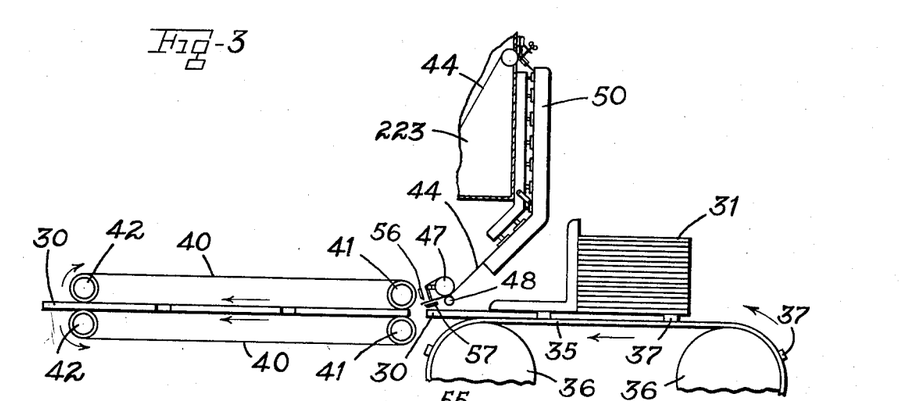
Fig. 3 is a diagrammatic side view illustrating the operation of the apparatus of Fig. 1.

Referring to the drawings, which illustrate preferred embodiments of the invention, Figs. 1 to 3 show somewhat schematically apparatus for performing a continuous taping operation in which each successive fold carton blank 30 of corrugated board from a supply stack 31 has a strip 32 of thermoplastic adhesive tape applied to the joint 33 formed by the meeting edges of the panel portions which form the edges of the finished carton, the tape 32 thus sealing the sides of the carton blank with the edges of the blank remaining open for subsequent assembly in the usual way.

An endless conveyor 35 running over spaced rolls 36 is provided with spaced feed bars 37 for conveying successive blanks 30 from the stack 31 to a pair of opposed upper and lower pressure belts 40 running over two pairs of rolls 41 and 42. The web of tape 44 has the adhesive coating 45 on its lower surface, and it is fed from a continuous supply roll 46 by a pair of feed rolls 47 and 48 at a rate coordinated with the travel of blanks 30 so that the leading end of the tape web meets each successive blank at the nip of belts 40 in proper registry with the leading end of the joint 33 to be sealed.

An electric heater unit indicated generally at 50 is positioned between the supply roll 46 and the feed rolls 47 and 48 to provide for heating and thus softening the coating on the tape so that it is in sealing condition as delivered to the nip of the pressure belts. This heater includes a metal heating surface 51, and the tape passes over stationary guide bars 52 and is held in wiping pressure contact with the heating surface 51 by means of a plurality of pressure pads 55. As the tape and blank are pressed together at the nip of the pressure rolls 41 and 42, they are drawn forward in sealing contact by the movement of belts 40, and cooperating cutoff knives or blades 56 and 57 to form shears for severing the tape after the proper predetermined length has passed equal to the length of the strip to be applied to joint 33.

The drive for the apparatus is provided from a motor or other power source indicated diagrammatically at 60 to a drive shaft 61, which carries a belt or sprocket 62. A belt or chain 63 transmits the drive to a pulley or sprocket 64 on the shaft 65 carrying the forward conveyor roll, and the drive is similarly transmitted to a pulley or sprocket 66 which drives a cam shaft 67 through a releasable clutch 68. The belt or chain 63 similarly drives the pulleys or sprockets 70 and 71 on the shafts 72 and 73 respectively which carry the rolls 41 for pressure belts 40, the tension of belt 63 being controlled by an idler 74, and it will be noted that the wheels 64, 70 and 71 are of different relative sizes in accordance with the diameters of the rolls 36 and 41 for properly correlating the linear speeds of the conveyor 35 and belts 40.

Cam shaft 67 carries a cam 75 (Fig. 2) which operates a reciprocable rack 76 against a spring 77, the rack being guided by roller 78 in slots 79, and the toothed portion of the rack is in mesh with the pinion 80 on a shaft 81 which carries the upper feed roll 47. A one-way ratchet drive is provided between shaft 81 and feed roll 47, as shown at 82 in Fig. 5, which effects positive driving only in the direction to advance the tape, during the upward stroke of the rack against spring.

Figures 4, 5, 6, 7:
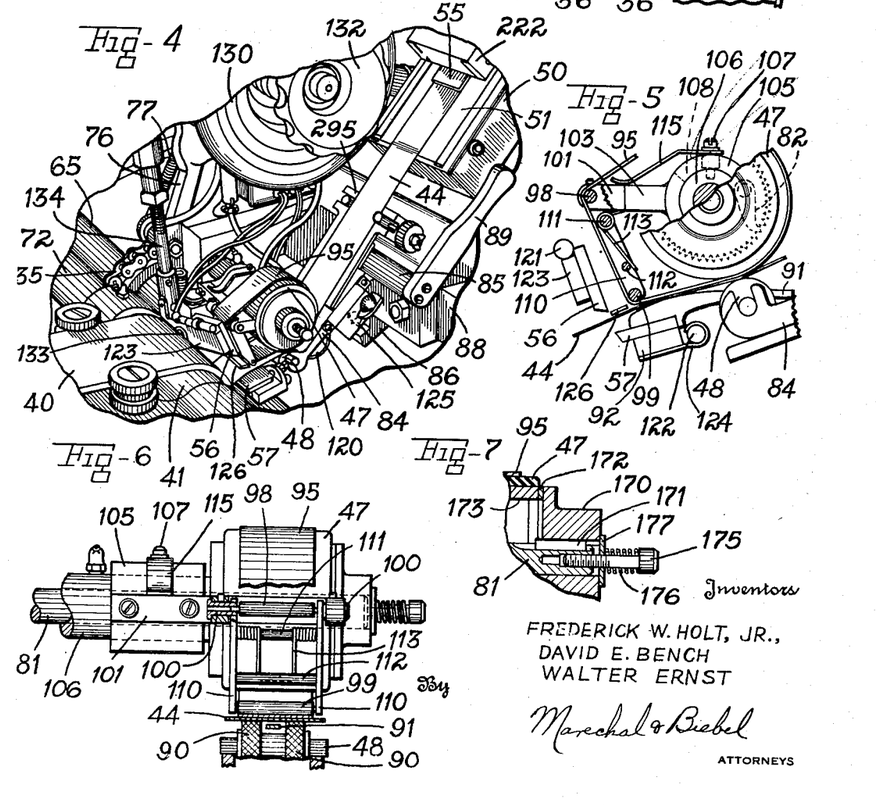
Fig. 4 is an enlarged detail view in perspective showing the tape feeding and cutoff mechanism of the apparatus.
Fig. 5 is a fragmentary view partly in side elevation and partly broken away and in section of the tape feeding mechanism.
Fig. 6 is a fragmentary view of the tape feeding mechanism looking from left to right in Fig. 5.
Fig. 7 is a fragmentary view in section through the main feed roll to show the friction brake for preventing overrunning of the feed mechanism.

The lower feed roll 48 is mounted in a holder 84 pivoted by shaft 85 to a bracket 86 on the main frame 88 of the machine, and a spring (not shown) is positioned between the lower portion of bracket 86 and holder 84 to urge the holder resiliently upwardly for positioning the feed rolls in driving contact with each other. A handle 89 on shaft 85 provides for swinging holder 84 against the spring to separate the feed rolls when threading the tape. As shown in Fig. 6, the lower feed roll 48 is spool shaped and includes two knurled half portions 90 which engage the coated side of the tape and which are separated by a circumferential groove to minimize contact between the surface of the roll and the adhesive coating on the tape, and a guide finger 91 is mounted on the holder 92 for the lower knife blade 57 and extends through this groove between the knurled roll portions 90.

In order to prevent possible buckling of the tape upwardly into the space between the feed roll 47 and the upper knife 56, a belt 95 is provided which runs over feed roll 47 and a pair of idler rollers 98 and 99. The roller 98 is supported by bushings 100 mounted in yoke portions of an arm 101 bolted to a boss portion 103 of a collar 105 rotatable on the fixed bearing 106 on frame 88 which supports the drive shaft 81 for feed roll 47. A bolt 107 extends through a slot 108 in collar 105 and into the bearing 106 to limit movement of the collar along the bearing.

The roller 99 is a tensioning roller for belt 95, and it is carried by the lower ends of a pair of arms 110 pivoted on the bushings 100 and connected by a pair of cross rods 111 and 112. A torsion spring 113 is wound on rod 111 with its ends engaging the underside of arm 101 and with a downwardly extending central loop portion engaging the bar 112 in such manner as to bias arms 110 in clockwise direction as viewed in Fig. 5 to maintain tension on belt 95. A leaf spring 115 is carried by bolt 107, and its free end engages the upper surface of arm 101 and boss 103 to urge the entire belt assembly in counterclockwise direction as viewed in Fig. 5 and thus to maintain the belt 95 in contact with the upper surface of the tape emerging from the feed rolls.

In order to prevent undesirable deposit of adhesive material from the softened coating on the tape to the feeding and severing mechanism, heaters are provided for these parts to maintain them at a temperature minimizing the tendency of the softened adhesive to deposit thereon. Thus a disk type of heater element 120 is secured directly to the underside of the holder 84 for the lower feed roll, and cartridge type heaters 121 and 122 are shown as mounted on the holder 123 for the upper knife blade 56 and the holder 92 for the lower knife blade 57, respectively, as by means of clips 124. An adjustable thermoswitch 125 is mounted on holder 84 for controlling the temperatures of these three heaters, as described in connection with the wiring diagram in Fig. 18. A finger 126 is mounted on the frame in position to extend above the tape between the tensioning roller 99 and the upper knife blade 56 to form a stripper preventing the leading end of the tape from sticking to the knife blade as the latter rises from its cutting stroke.

The cutoff operation of the knife blades is effected by the cam shaft 67, which operates the upper knife 56 by means of an adjustable cam 130 (Fig. 1) having a drop-off notch 131. A locking member 132 releasably secures cam 130 to shaft 67 to provide for adjustment thereof on the shaft. The knife 56 is pivotally mounted at 133, and the lower end of a rod 134 is connected thereto at the opposite side of pivot 133 from the blade portion of the knife. The upper end of rod 134 is connected to a cam lever 135 pivotally mounted at 136 and provided with a cam follower 137 for cam 130. A spring 140 is secured to the opposite end of lever 135 from rod 134 in position to rock the lever on pivot 136 in clockwise direction as viewed in Fig. 1. Thus when the cam follower 137 drops into the notch 131 as cam 130 revolves, lever 135 will rock and cause the knife 56 to rock on pivot 133 and execute a shearing stroke with respect to knife 57. The adjustable mounting of cam 130 provides for presetting to effect the cutoff at a desired point in the cycle in accordance with the length of the tape to be applied to each blank 30, the cam being shown as provided with calibrations 141 in terms of the length of tape to be cut off.

A pre-feeding assembly is provided for the tape between the supply roll 46 and the heater 50. The tape passes from the supply roll to a pair of feed rolls 150 and 151, the latter being on a shaft 152 driven from cam shaft 67 by pulleys or sprockets 153 and 154 and a belt or chain 155. The tape then passes in a loop 156 to a roller 157 on a shaft 158 carrying a pulley or sprocket 160 driven through belt or chain 161 by a pulley or sprocket 162 on a common shaft with a pulley or sprocket 163 which is in driven engagement with the belt or chain 155. A follower or rider bar 165 is supported by loop 156 and is connected with driven roll 151, as indicated diagrammatically at 166, to vary the pressure between rolls 150 and 151 inversely in accordance with the length of loop 156 and thus to maintain the feed to rolls 47—48 at a substantially constant rate. From roll 157, the tape passes between the heater 50 and pressure pads 55, and it is drawn through in contact with the heating surface 51 by the feed rolls 47 and 48 and the pressure belts 40 as already described.

In operation, the movement of the tape as effected by the feed rolls is coordinated with the movement of the blanks 30 at the start of the operation so that the leading end of the tape reaches the nip of pressure belts 40 in proper registry with the leading end of the joint 33 to be sealed, and the relative speeds of the tape and blanks is such that one blank is taped during each revolution of the cam shaft 67. Also the cam 130 is initially adjusted and synchronized with the conveyor 35 in accordance with the dimensions of the blanks 30 and the length of the joint 33 to operate the cutoff knife at the proper instant in each cycle to cut off a length of tape equal to the length of joint 33, these relative adjustments being readily carried out while the clutch 68 on cam shaft 67 is disengaged.

In a typical operation, starting with the parts in the relative positions indicated in Fig. 3, the cam 75 will operate rack 76 at the proper instant to move upwardly against spring 77 and thus to drive feed rolls 47—48 and effect advance of the leading end of the tape to meet the approaching blank 30 in registry with the crease 167 at the leading end of joint 33. The feed rolls drive the tape until its leading end is well within the pressure belts, and then as cam 75 passes its high point and rack 76 moves downwardly under the urging of spring 77, the upper feed roll 47 overruns ratchet 82 as a result of the pull on the tape from the moving pressure belts, thus permitting the rack and shaft 81 to return to their proper positions for the next feeding stroke. This action is continued until the predetermined proper length of tape has run past the upper cutoff knife, and then cam 130 operates the knife as already described to sever the tape.

If the feed roll 47 should overrun as a result of its momentum after the tape is cut off by knife 56, the result would be to advance the leading end of the tape against the side of the knife before the latter returns to its upper position, with the result that it tends to buckle and possibly to turn under or turn over itself at the beginning of the next taping operation. In order to prevent this result, a friction brake is provided for the feed as shown in Fig. 7. The outer end hub 170 is keyed at 171 to the end of shaft 81, and a friction washer 172 is provided between hub 170 and the adjacent end of the inner cylindrical portion 173 of the feed roll. A bolt 175 is threaded into the end of shaft 81, and a spring 176 is provided between the head of this bolt and a washer 177 overlying the end of the hub. This arrangement provides a drag on the feed roll which is adjustable through the bolt 175 to permit the feed roll to overrun its ratchet drive 82 while the tape is being pulled through between the two rolls by pressure belts 40. However, as soon as this pull stops as a result of operation of the cutoff knife, this friction brake stops the feed roll and prevents it from continuing to turn until the next feeding stroke.

The heater 50 is shown in detail in Figs. 8 to 12, and it is mounted at the back of the machine for movement between an advanced operative position and a retracted inoperative position which is removed both laterally and rearwardly from its operative position. The metal plate 51 which forms the heating surface of the heater is channeled in cross section and includes a vertical upper portion and a forwardly inclined lower portion, and a central rib 200 is welded to the back of this channel. Four strip type heaters 201, 202, 203 and 204 are secured within the channel portion of the heater plate 51 by means of clamps 205 and bolts 206, the two heaters 201 and 202 being in the vertical part of the channel and the other two heaters 203 and 204 being in the inclined lower part. Reinforcing strips 207 are bolted to the sides of plate 51 at the junction between its vertical and inclined portions, and a casing 210 filled with heat insulating material 211 encloses the back and sides of the heater. An adjustable thermoswitch 212 is mounted on the heater for controlling the temperatures of all four heating elements as described in connection with the wiring diagram in Fig. 18.

The mounting for the heater includes two arms 220 and 221 extending laterally from the channeled frame 222 which is bolted to the back of the housing 223 for the tape supply and prefeed mechanism and which also supports the pressure pads 55 as described hereinafter. The arm 220 includes a bearing portion 224 at its outer end, and a shaft 225 is mounted in this bearing and in a similar bearing portion at the outer end of arm 221. The shaft 225 is rotatable in the arms 220 and 221 and is held axially by a collar 226 which is pinned thereto and rests on the upper surface of the bearing portion of arm 221.

An I-shaped frame 230 is supported on and pinned to shaft 225 for movement therewith, and this frame also carries a shaft 231 which is opposite and parallel to shaft 225. This shaft 231 carries two bearings 232 and 233 which are in turn bolted to brackets 235 extending laterally from the frame of heater 50, and the upper bearing 232 includes a laterally projecting yoke portion 236 in which is pivoted one end of a link 237 having its opposite end pivoted in the bearing portion 224 of arm 220. The distance between the pivot points of link 237 is equal to the distance between shafts 225 and 231, and each of these shafts is equally spaced from the adjacent pivot point of the link to maintain the link parallel with the top and bottom portions of the I-shaped frame 230 in all positions of the frame and heater 50.

Figures 8, 9, 10, 11:
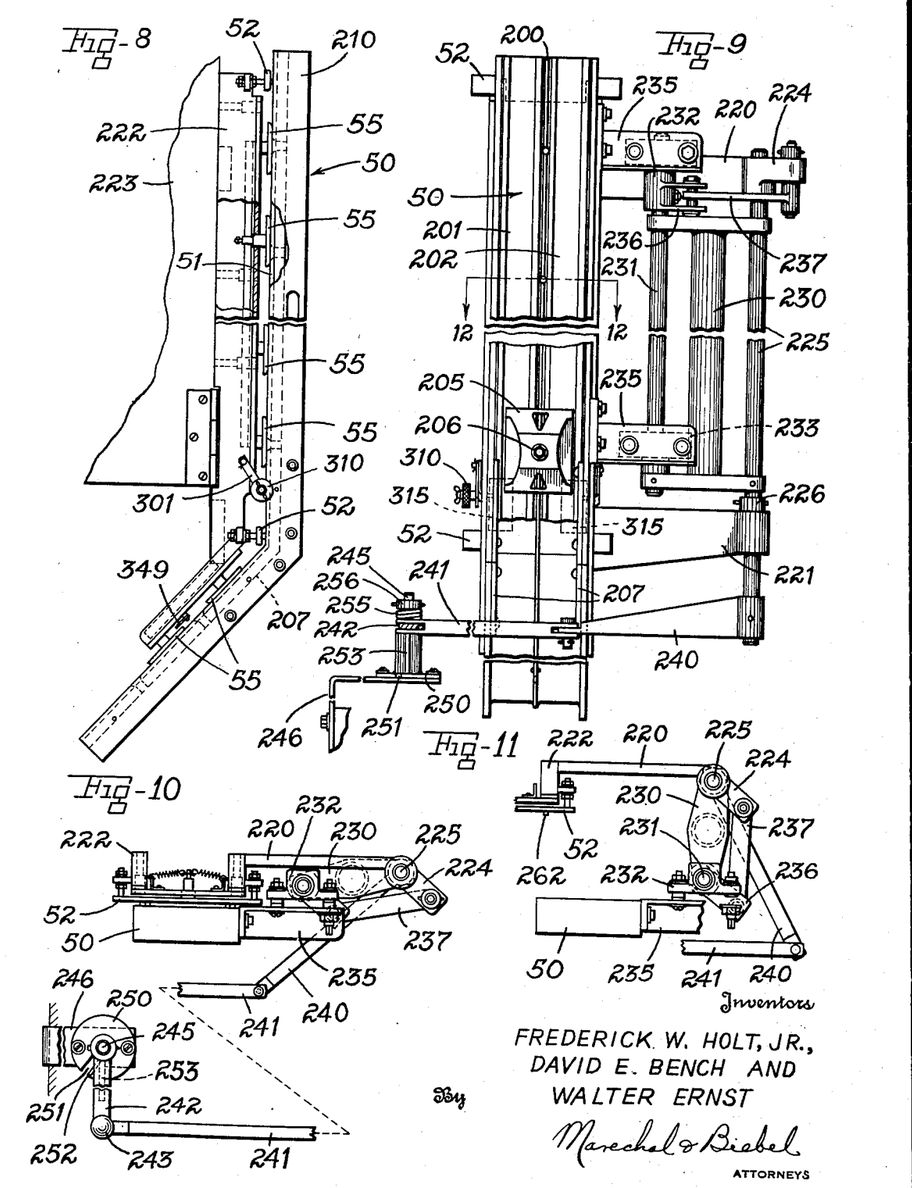
Fig. 8 is a detail view partly in side elevation and partly broken away showing the heater and associated parts of the frame including the pressure pads for maintaining contact between the tape and the heater.
Fig. 9 is a view of the heater looking from right to left in Fig. 8 and showing the mounting mechanism for the heater.
Fig. 10 is a top view of the heater and its mounting mechanism showing the heater in operative position.
Fig. 11 is a fragmentary top view showing the heater moved to its retracted inoperative position.

The lower end of shaft 225 carries a lever arm 240 pivoted to one end of a rod 241 which extends laterally of the machine and is in turn pivoted to an arm 242 provided with an operating handle 243. The arm 242 is mounted on an upright shaft 245 on a bracket 246 on the machine frame, and Figs. 10 and 11 illustrate the operation of arms 240 and 242 in shifting the heater between its operative position shown in Fig. 10 and its inoperative position shown in Fig. 11. As shaft 225 turns, frame 230 turns with it, and link 237 maintains the heater surface 51 parallel with the tape surface throughout this movement.

It has been found convenient to mount arm 242 near the control switches of the machine for ready operation in conjunction with the switches, and a cam lock is provided for holding this arm in the operative position of the heater. As shown in Figs. 9 and 10, a disk 250 is bolted to the bracket 246 and is provided with a slot 251 having a beveled edge 252. This slot is shaped to receive the web portion 253 of arm 242, and a spring 255 is positioned on shaft 245 between the arm 242 and a collar 256 to urge the arm downwardly. Thus as the arm moves in clockwise direction as viewed in Fig. 10 towards the operative position of the heater, the web 253 will fit within slot 251 under the urging of spring 255 to hold the heater in operative position, while at the same time the arm can be readily moved out of engagement in this slot when it is desired to retract the heater.

Figures 12, 13, 14, 15, 16, 17:
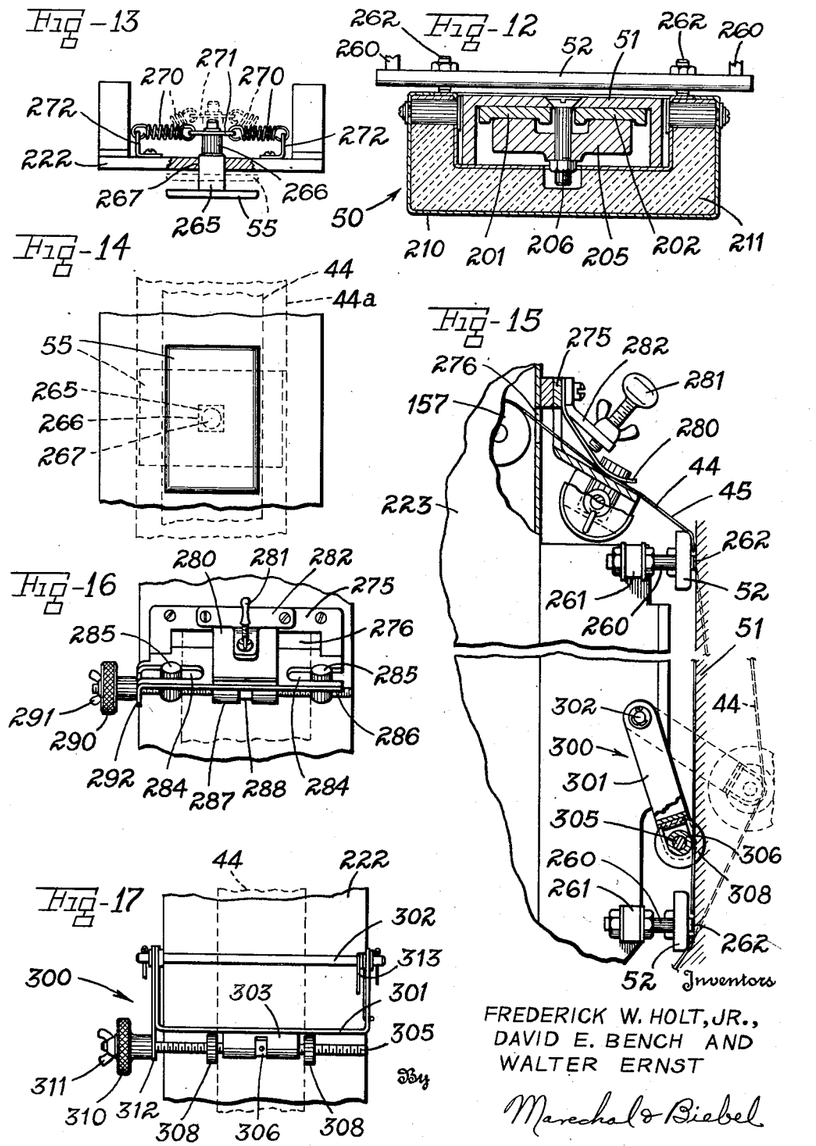
Fig. 12 is a detail view through the heater taken approximately on the line 12—12 of Fig. 9.
Fig. 13 is a detailed top view, partly broken away, showing one of the pressure pads for the tape.
Fig. 14 is a front view of the pressure pad and illustrating the two operative positions of the pad.
Fig. 15 is an enlarged fragmentary view of the back portion of the tape supply cabinet to show the guides for the tape.
Fig. 16 is a detail view looking from right to left in Fig. 15 showing the adjustable guide at the upper part of the tape supply cabinet.
Fig. 17 is a detail view looking from right to left in Fig. 15 of the swinging guide member at the lower part of the tape supply cabinet.

The stationary guide bars 52 cooperate with the heater to locate it in proper position. Referring to Figs. 12 and 15, these guide bars 52 are mounted respectively at the upper and lower ends of the frame 222 by means of adjustable bolts 260 set in laterally projecting lugs 261 at the sides of the frame 222. Set screws 262 are positioned at either side of the center of each bar 52 for direct contact with the heating surface 51 of the heater, these set screws projecting sufficiently forwardly of the bars to provide running clearance for the tape between the bars and the heating surface 51 and thus forming positive stops against which the heater seats in its operative position. The lower of the bars 52 is located in line with the junction of the two portions of heater 50 as shown in Fig. 15 to assure contact between the tape and the entire length of heating surface 51.

The pressure pads 55 and their associated mounting means are shown in detail in Figs. 13 and 14. The face of each of these pads is shown as rectangular and is polished for reduced friction against the back of the tape. A shank extends rearwardly from each pad 55 and is formed with a square forward portion 265 and a cylindrical rearward portion 266 of smaller diameter. The channel 222 is formed with a rectangular opening 267 therethrough which is of proper dimensions to receive the square shank portion 265 slidably but nonrotatably therein and which is also sufficiently large to permit rotation of the shank portion 266 therein. Two coil springs 270 are connected with the rearward end of the shank by means of a collar or washer 271, and the other ends of these springs are secured to frame 22 by means of angle brackets 272.

With this arrangement, the normal position of the springs 270 is substantially transverse of the shank as shown in full lines in Fig. 13, but when the heater is moved to its operative position in which the faces of the pads 55 contact the heating surface 51, the pads are moved rearwardly against the springs to the position indicated in dotted lines in Fig. 13, thus providing pressure through the springs between the pad face and the heater. This arrangement also has the advantage that relatively heavy springs 270 can be used to obtain a comparatively light spring pressure, thus avoiding the necessity for using light springs of relatively shorter useful life. Also, the effective pressure of the springs can be readily varied by adjustment of the bolts 260 which support guide bars 52, since it is the position of these guide bars which determines the operative position of the heater and thus the extent to which the heater forces the pads back against springs 270. In addition, the guide bars prevent jerking of the tape against the pressure pads at the start of each feeding stroke and thus aid in maintaining even pressure between the tape and the heating surface 51.

Guide units are provided at a plurality of positions on the machine for guiding the tape laterally, particularly in order to maintain the tape in proper alignment with the heater and the pressure pads 55. Referring to Figs. 15 and 16, a bracket 275 is bolted to the back of the tape cabinet 223 and is formed with a slot for the tape which coincides with the slot 276 in the back of the cabinet. The upper surface of this bracket forms a support for the tape, and a tension spring 280 is also bolted to the back of the cabinet in position to bear against the tape as it rides over the surface of bracket 275. The degree of tension of this spring is adjustable by means of a thumb screw 281 carried by a supporting bracket 282 also bolted to the back of the cabinet.

At either end of bracket 275 is a slot 284 which forms a guideway for the upper end of one of a pair of guide pins 285, and the lower ends of these pins are threaded on a threaded rod 286 supported by a centrally located bearing portion 287 of the bracket. The rod 286 is oppositely threaded at either end, and it is held axially in the bracket by a collar 288 in a slot in the bearing portion 287. As a result, rotation of the rod 286 will cause the guide pins 285 to move laterally as required to adjust the distance between these pins to tapes of different widths. A knob 290 is secured to one end of rod 286, and it may be locked in the desired adjusted position of the guide pins by means of a wing nut 291 on the outer end of the rod and a turned down portion 292 at the outer end of the bracket.

A guide unit 295 similar in construction and operation to the unit just described is mounted on the holder 84 for feed roll 48 as shown in Figs. 1 and 4. This guide unit is similarly adjustable to different widths of tape and serves to maintain the forward part of the tape in proper alignment with the lowermost heating pads 55 and the feed rolls 47 and 48.

An additional guiding unit indicated generally at 300 is pivoted on the lower part of the channel frame 222. Referring to Figs. 15 and 17, this unit includes a yoke 301 pivoted on a rod 302 extending through the frame 222, and the lower portion of this yoke includes a bearing portion 303 supporting a rod 305 similar to the rod 286 and similarly oppositely threaded at either end. The rod 305 is held axially by a collar 306 in a centrally positioned slot in bearing 303, and nuts 308 are threaded on the opposite ends of the rod. These nuts serve as guides for the edges of the tape, and they are provided with a flat portion which abuts the adjacent part of yoke 301 to prevent rotation of the nuts as the rod 305 is rotated by means of its knob 310. The rod may be locked in a desired adjusted position of the nuts 308 by means of the wing nut 311 and an extension 312 on yoke 301.

In addition to its function as an edge guide for the tape, the guiding unit 300 serves to take up slack in the tape when the machine is shut down and as it is coasting to a stop after the heater 51 is swung to its retracted position. As shown in Fig. 17, a torsion spring 313 is provided on rod 302 which is arranged to bias the yoke 301 towards the heater as shown in dotted lines in Fig. 15. It will also be noted that the frame 222 is cut away adjacent its lower end to receive the guide unit 300 and also the heater surface 51 is grooved at 315 (Fig. 9) to provide clearance for the guide nuts 308 in the operative position of the heater.

Figures 19, 22:
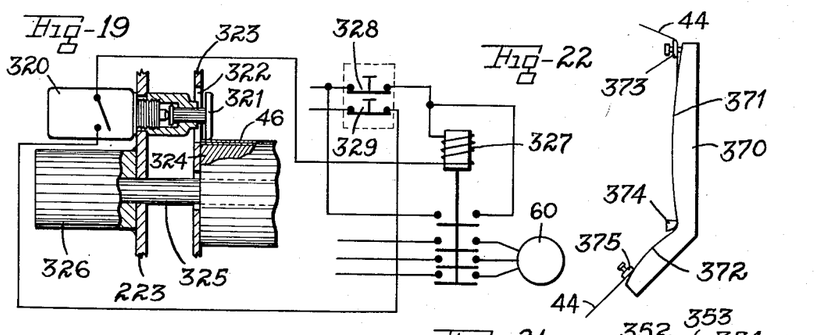
Fig. 19 is a detail view of a fragment of the tape supply cabinet showing the run-out switch for indicating approaching exhaustion of the tape supply.
Fig. 22 is a diagrammatic side view showing another form of heater for the apparatus.

These several guide units maintain the tape in proper alignment with the pressure pads to minimize the possibilty of lateral drift such as might result in objectionable transfer of softened adhesive to the face of the pressure pads by direct contact of the pressure pad with the heater surface 51 or by smearing from the edge of the tape to the pad face. Additional protection against this undesirable result is provided by a run-out switch 320 (Fig. 19) at the tape supply roll 46 which stops the machine before the supply of tape is exhausted. Referring to Fig. 19, the switch 320 is mounted in the side of casing 223, and it is operated by a plunger 321 which extends through a hole 322 in the inner panel 323 of casing 223 in close proximity to the supporting sleeve 324 on spindle 325 which receives the supply roll of tape, the outer end of spindle 325 being supported in a boss 326 welded to the outer surface of casing 223.

The switch plunger 321 is so positioned that it is normally held in depressed position by the tape on the supply roll, thus closing switch 320, but as the supply runs out and before the trailing end of the tape leaves the cabinet, the plunger is released to open the switch. The switch 320 is shown as connected in a holding circuit for the energizing coil of the starting relay 327 for the motor 60, this relay being controlled by a normally open starting switch 328 and a normally closed stop switch 329. With this arrangement, release of plunger 321 with open switch 320 and the energizing circuit for relay 327 to stop the motor, and when this occurs, the operator will know that the tape supply is exhausted and can then swing the heater to its retracted position preparatory to inserting a fresh supply roll and splicing its leading end to the trailing end of the tape remaining in the machine.

Figure 18:
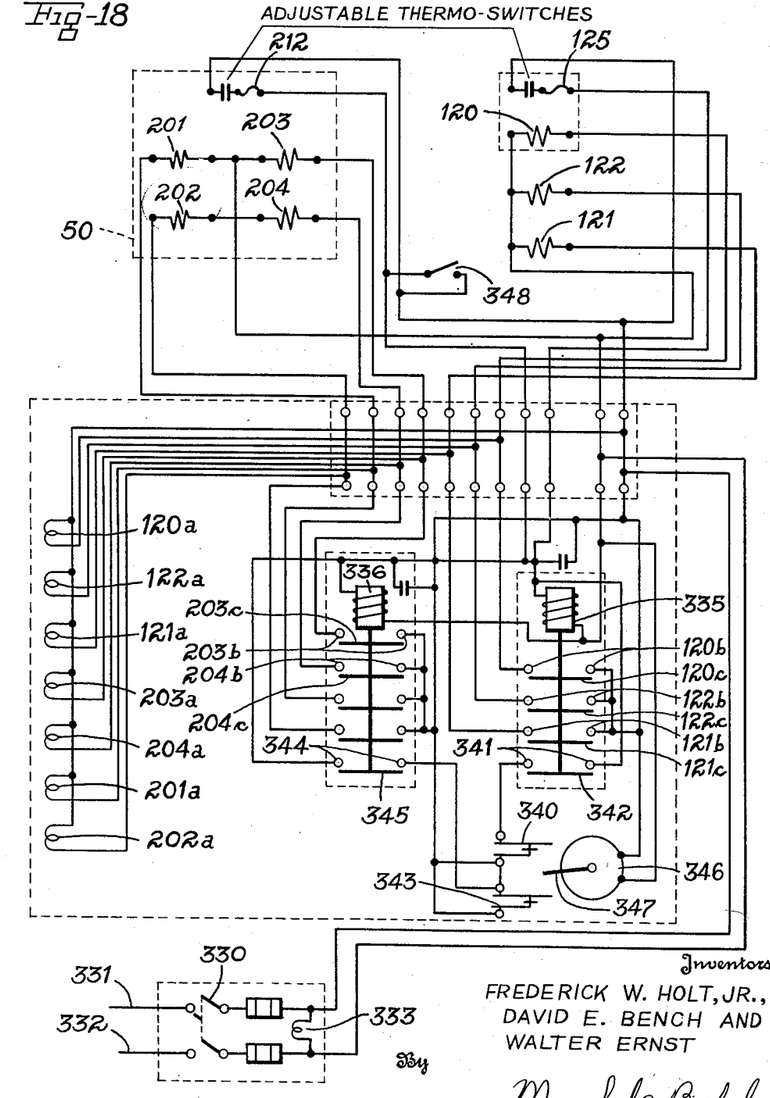
Fig. 18 is a wiring diagram showing the heating system of the apparatus.

Fig. 18 shows the electric circuits for the heater system of the machine, which includes a series of signal lights connected individually with each of the several heater elements for indicating to the operator any failure of a heater element. For convenience in reading the wiring diagram, the signal lights have been designated as 120a, 121a, etc. in accordance with the reference character and of the corresponding heater element. The main control switch 330 for the heater circuits which controls the supply lines 331 and 332 is also provided with a signal light 333 indicating its closed position. The three heaters 120, 121 and 122 are operated as a group through a relay 335 controlled by the thermo-switch 125, and the four heaters 201—204 are similarly operated as a group by a relay 336 controlled by the thermo-switch 212.

The circuits for the several heaters and their associated indicator lights are so arranged that the lights are lighted while the heaters are not operating, and vice versa. As shown in Fig. 18, the signal light 120a, for example, is energized through its associated heater 120 while the relay 335 is open, but the relay includes a pair of contacts 120b which are short circuited by the switch blade 120c of the relay when the latter is closed by switch 125 to operate the three heaters 120—122. Similar contacts and switch blades 121b, 121c, etc. are provided in the relays 335 and 336 for the other signal lights. Thus in the operation of the machine, the heaters are operated periodically through their respective thermo-switches to maintain the temperature of the heating surface 51 and at the tape feeding and severing means within desired predetermined ranges, and when either set of heaters is on, its associated set of signal lights will be off and vice versa. However, since each signal light is lighted through its associated heater, failure of the heater will cause failure of its signal light, and when the operator observes that signal light is out while the others of its set are on, he will immediately know that its associated heater has burned out and requires replacement.

A hold-in circuit is provided for preventing chattering of the relays such as might occur when the contacts of either of the thermo-switches are not fully opened or full closed, particularly under the vibration conditions set up by the operation of the remainder of the machine. A normally closed switch 340 is connected in the energizing circuit for the coil of relay 335 through a pair of switch contacts 341 and switch blade 342 in relay 335. A similar normally closed switch 343 is connected with the energizing coil of relay 336 through a pair of contacts 344 and switch blade 345 in relay 336. A small electric motor 346 carries a cam arm 347 which operates to effect temporary opening of each of the switches 340 and 343 once during each revolution of the motor, which preferably operates at a low rate such as 10 R. P. M.

It will thus be seen that if switch 125, for example, closes as a result of a temperature drop at the tape feeding means, it will cause relay 335 to close and thus complete the hold-in circuit through the blade 342 and switch 340. As a result, even though this closing be temporary as result of temporary contact of the switch points of the thermo-switch, the relay will remain closed even though the thermo-switch subsequently opens. However, during each revolution of the motor 346, its cam arm 347 will open the switch 340 temporarily, and if at that instant the switch 125 is also open, then the relay will be de-energized and will similarly open to disconnect the heaters. However, if at the instant when switch 340 is open, the switch 125 is still closed, then the relay will remain closed. The switch 343 operates in similar manner in conjunction with the thermo-switch 312 and relay 336.

A manually operable switch 348 is provided in parallel with the thermo-switch 212 for use if it is desired to raise the temperature of the main heaters above the normal range provided for by the thermoswitch. For example, with some of the adhesives used with this machine, accumulated adhesive on the heater surface 51 can be readily burned off or vaporized by raising the heater temperatures above the range used for softening the adhesive during normal operation of the machine. When this is desired, the switch 348 is manually closed and maintained in the closed position as long as necessary to eliminate the accumulated adhesive on the heaters.

This wiring arrangement together with the other structural features already described provides an effective apparatus for the application of tape having a thermoplastic adhesive, and it is also readily adjustable as required in accordance with the softening temperatures of the particular adhesive being employed. Also the apparatus is simple to control and maintain during operation with minimum likelihood of undesirable results such as an insufficient softening of the adhesive or objectionable transfer of adhesive to the working parts. Thus at the beginning of the work operation, the several heaters can be brought up to the desired temperature range while the heater 50 is in its retracted position, and then with the control lever 242 for the heater located conveniently close to the starting switch for motor 60, the heater can be brought into operative position in timed relation with the starting of the motor so that the taping operations will begin as soon as the tape is properly softened and with minimum danger of overheating any part of the tape.

The apparatus constructed as described also has the advantage of ready conversion for use with tape having a water soluble adhesive coating if it is desired to use such tape. This conversion may be readily effected by first disconnecting the link 237 from the bearing 232, whereupon the heater can be swung beyond its normal retracted position and will thus be completely out of the way without requiring dismantling from the machine. A water box for moistening the tape can then be mounted on the frame 88 adjacent the shaft 85, and if it is found that the lowermost pad 55 interferes with the water box, it can be held up out of the way by means of a simple clip 349 as indicated in Fig. 8. Since heaters at the feeding rolls are not required with a water soluble adhesive, the support 84 for the lower feed roll may be removed and replaced by a simpler support, and the apparatus can then be operated in the usual way without other adjustments except perhaps to tighten the thumb screw 281 in order to place somewhat greater tension on the tape as a result of the reduction in drag owing to the retraction of the heater.

Figure 20:
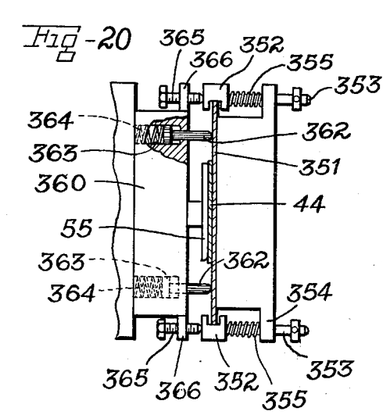
Fig. 20 is a top view, partly broken away, of a modified construction of heater for the apparatus, showing the heater in operative position.
Figure 21:
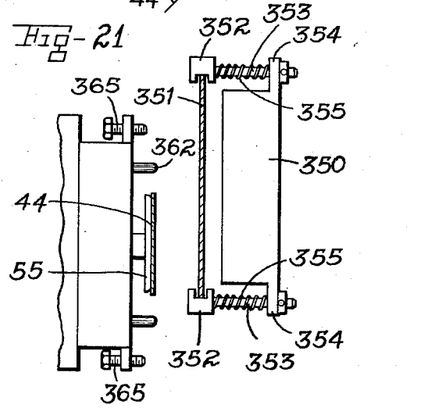
Fig. 21 is a view similar to Fig. 20 showing the heater in retracted position.

Figs. 20 to 24 show several alternative constructions of heaters which may be substituted in the machine for the particular heater construction described in connection with Figs. 8 to 12. The heater shown in Figs. 20 and 21 is constructed to provide for accelerated cooling of the heating surface following retraction of the heater unit from its operating position in order to minimize baking of deposited adhesive on the heater surface. The heater 350 includes heating elements which may be constructed and arranged substantially as described in connection with Figs. 8 to 12. The plate 351, which forms the heating surface of the heater, is carried in movable relation with the remainder of the heater unit by means of side frames 352 which are supported by rods 353 slidable in laterally projecting lugs 354 on the heater. The rods 353 are sufficiently long to permit retraction of the plate 351 out of contact with the heating part of the heater, and springs 355 on rods 353 normally maintain the plate 351 in the spaced position from the heater shown in Fig. 21.

The frame 360 corresponds to the frame 222 and supports pressure pads 55 as shown. In addition, this frame is provided with a plurality of pins 362 which project towards the heater and have enlarged heads slidable in bores 363 in the frame provided with springs 364. Bolts 365 in laterally projecting lugs 366 on the frame 360 serve as adjustable stops for the heater in its operative position. Thus when the heater is in its retracted position shown in Fig. 21, the springs 355 move the frames 352 away from the heater to separate the plate 351 from the heater elements in the heater, and if this plate is a thin metal such as aluminum, it will quickly cool sufficiently to permit undesirable burning of any deposited adhesive material on its outer surface. When the heater is swung to its operative position shown in Fig. 20, the bolts 366 will contact the frames 352 and force them towards the heater against springs 355. The plate 351 is preferably loose in the frames 352 as shown, and the pins 362 will accordingly contact the face of the plate and resiliently urge it into the proper heating engagement with the body of the heater. In this position of the parts, the pressure pads 55 will function as already described to maintain the tape in proper heating contact with the heater plate 351 as shown in Fig. 20.

Fig. 22 shows another construction of heater 370 having two heating surface portions 371 and 372, each of which is provided with a generally cylindrical convex curvature. With this heater construction, pressure pads such as shown at 55 in other views are not necessary. Instead, three fixed guide bars 373, 374 and 375 which are similar to the guide bars 52 are mounted at the upper and lower ends of the heater and at the junction of the heating surfaces 371 and 372. These fixed guide bars cooperate with the heater when the tape 44 is being pulled through the machine to maintain sufficient tension in the tape to force it into the desired pressure contact between its coated surface and the heating surfaces 371 and 372. Also, since the back of the tape is in contact only with the stationary guide bars, there is a substantially less friction on the tape as compared with the friction existing when the pressure pads 55 are used.

Figure 23:
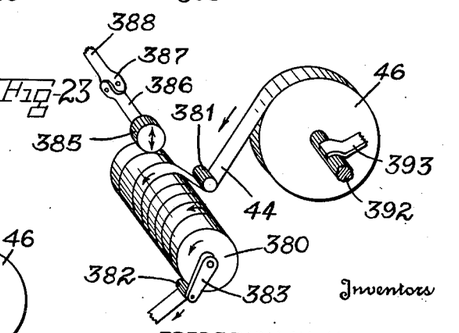
Fig. 23 is a fragmentary view in perspective showing a rotary heater for the apparatus.
Figure 24:
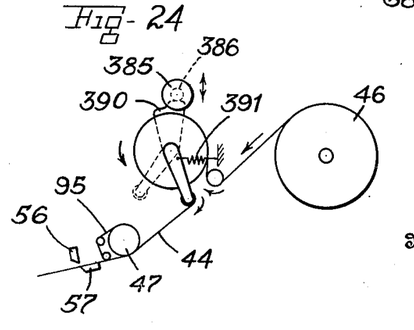
Fig. 24 is a diagrammatic side view illustrating the operation of the heater of Fig. 23.

Figs. 23 and 24 show a cylindrical heating drum 380 over which the tape 44 is wound for a plurality of turns in order to increase the effective area of heating surface while maintaining the diameter of the heater within convenient limits. This drum may be readily driven from the prefeed mechanism of the machine to provide minimum friction between the tape and the drum surface. As shown, the tape passes first from the supply roll under a stationary idler 381, and after wrapping several turns around the drum, the tape passes around an idler 382 carried by a swinging arm 383 pivoted on the drum axis. A positive drive for the drum is provided by a friction drive wheel 385 on a shaft 386 connected by a universal joint 387 with a shaft 388 which corresponds with shaft 152 in Fig. 1. A cam segment 390 is carried by the same shaft as the swinging arm 383 for movement with the arm and forming therewith effectively a bell crank lever. This cam is adapted in the position shown in Fig. 24 to contact the shaft 386 and thus raise the drive wheel 385 out of contact with the drum, and a spring 391 is arranged to bias arm 383 in the direction to move cam 390 into this position.

In the operation of this form of heater, when the tape is feeding at the proper rate to maintain the desired tension therein at the feed rolls, the spring 391 will hold the arm 383 in the position shown in full lines in Fig. 24. If the drag on the tape exceeds the desired amount, the arm 383 will be forced to swing against the pull of spring 391 as indicated by dotted lines in Fig. 24. When this occurs, cam 390 will similarly swing out of contact with shaft 386, thus permitting the drive wheel 385 to drop into driving contact with the drum and provide a positive drive until the desired tension is restored in the tape. In order to prevent undesirable slack in the tape between the drum and the supply roll, a suitable brake tension may be provided on the shaft 392 supporting the roll, as indicated at 393.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means for guiding said tape to said heating surface, pressure means for effecting heat exchanging contact between said coated surface of said tape and said heating surface to cause softening of said coating, means supporting said heater on said frame for movement between an operative position with respect to said guiding and pressure means and an inoperative position both retracted and laterally removed with respect to said guiding and pressure means to prevent overheating of said tape upon interruption of said feeding means, and means for aligning said heater with said guiding and pressure means to position said heating surface in substantially parallel relation with said tape for uniform heating of said coating lengthwise of said tape.

2. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means for guiding said tape to said heating surface, pressure means for effecting heat exchanging contact between said coated surface of said tape and said heating surface to cause softening thereof, means supporting said heater on said frame for movement between an operating position with respect to said guiding and pressure means and an inoperative position both retracted and laterally removed with respect to said guiding and pressure means to prevent overheating of said tape upon interruption of said feeding means, said supporting means including a plurality of parallel links arranged to maintain said heater with said heating surface in substantially parallel relation with said tape in said operative position for uniform heating of said coating lengthwise of said tape, and means under the control of the operator for effecting shifting of said heater upon said supporting means between said operative and inoperative positions.

3. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding said tape from said supply to said application point, a heater including a heating element intermediate said tape supply and said application point, means supporting said heater for movement between an advanced operative position and a retracted inoperative position, a heating plate mounted on said heater for movement into and out of heat exchanging relation with said heating element, means biasing said plate out of heat exchanging relation with said heating element to effect rapid cooling of said plate upon movement of said heater to said retracted position, means effective in said operative position of said heater for urging said plate into heat exchanging relation with said heating element, and means for guiding said tape into heat exchanging relation with said plate in said operative position of said heater to effect softening of said coating.

4. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means for guiding said tape to said heating surface, a plurality of pads aligned with said heater, each of said pads including a substantially flat face adapted to engage the uncoated surface of said tape and a shank extending generally normally from the back of said pad face, means supporting each of said shanks for axial movement with respect to said heater, and means for biasing each of said shanks toward said heater to press the coated surface of said tape into contact with said heating surface for softening said coating.

5. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means for guiding said tape to said heating surface, a pressure pad aligned with said heater for contact with the uncoated surface of said tape, said pad including a substantially flat face adapted to engage said tape and a shank extending generally normally from the back of said pad face, said pad face being generally rectangular to provide two alternatively effective contact areas of different widths for use with tape of correspondingly different widths, said shank including a noncircular portion adjacent said face and a rearward portion of smaller diameter than said noncircular portion, a support for said shank having a hole therein adapted to receive said noncircular shank portion in axially movable but nonrotatable relation and to receive said smaller shank portion rotatably therein, means for biasing said pressure member towards said heater to press said tape against said heating surface, and means yieldably retaining said shank with said noncircular portion thereof engaged in said hole to provide for temporary withdrawal of said shank sufficiently for rotation thereof through 90° to shift the effective width of said pad face in accordance with the width of said tape.

6. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, a plurality of stationary guide members on said frame adapted to engage the uncoated surface of said tape, means for feeding said tape from said supply over said guide members to said application point, a heater including a heating surface intermediate said tape supply and said application point, means for supporting said heater on said frame in predetermined operative relation with said guide members, and means cooperating with said guide members to effect pressure contact between the coated surface of said tape and said heating surface to cause softening of said coating.

7. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding said tape from said supply to said application point, a heater intermediate said tape supply and said application point, said heater having a convexly curved heating surface, and stationary guide means mounted on said frame adjacent the ends of said curved heating surface for cooperation with said heating surface to maintain said tape under tension effective to cause pressure contact between the coated surface thereof and said heating surface for softening said coating.

8. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding said tape from said supply to said application point, a heater intermediate said tape supply and said application point, said heater having a drum shaped heating surface adapted to have a plurality of turns of said tape wound thereon during passage of said tape from said supply to said application point, drive means for rotating said drum, control means for said drive means shiftable between an operating position causing said driving means to rotate said drum and a non-operating position wherein said drum is rotated by operation of said feeding means through said tape, and means responsive to the degree of tension in said tape between said heater and said feeding means for maintaining said control means in said non-operating position when said tension is within a desired range and movable in response to increase of said tension above said range to shift said control means to said operating position thereof.

9. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means supporting said heater on said frame for movement between an advanced operative position and a retracted inoperative position, means for guiding said tape to said heating surface, a pressure member aligned with said heater for contact with the uncoated surface of said tape, means for biasing said pressure member towards said heater to effect pressure contact between the coated surface of said tape and said heating surface for softening said coating, stationary guide members adapted to engage the uncoated surface of said tape, means supporting said guide members on said frame at either side of said pressure member in the direction of tape travel, stops on said guide members adapted to engage said heater in said operative position thereof to position said heating surface in predetermined relation with said frame for limiting the effective pressure of said pressure member under the urging of said biasing means, and means for adjusting said guide members normally of said tape to vary the effective pressure of said pressure member.

10. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, pressure means adapted to engage said heating surface, a plurality of guide units for guiding said tape between said pressure means and said heating surface for pressure contact between the coated surface of said tape and said heating surface, each of said guide units including a shaft arranged transversely of said tape and having oppositely threaded portions at either end thereof, a pair of guide members threaded on said shaft and adapted to engage opposite edges of said tape, means for retaining said guide members against rotation with said shaft, and means for rotating said shaft to adjust said guide members laterally of said tape in accordance with the width of said tape.

11. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means for guiding said tape to said heating surface, pressure means for effecting heat exchanging contact between said coated surface of said tape and said heating surface to cause softening of said surface, means supporting said heater for movement between an operative position with respect to said guiding and pressure means and a retracted inoperative position, and yieldable means on said frame adjacent said pressure means for biasing said tape away from said pressure means to take up slack in said tape following retraction of said heater from said operative position prior to stopping of said feeding means.

12. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means supporting said heater for movement between an advanced operative position and a retracted inoperative position, pressure means adapted to engage said heating surface in said operative position of said heater, a plurality of guide members on said frame adapted to engage the side edges of said tape and arranged in pairs to guide said tape between said pressure means and said heating surface, means supporting one pair of said guide members for movement with respect to said pressure means toward said heater, and means for biasing said movable guide members toward said heater to take up slack in said tape following retraction of said heater from said operative position and prior to stopping of said feeding means.

13. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, a pressure member adapted to engage said heating surface, means for guiding said tape member and said heating surface for pressure contact between the coated surface of said tape and said heating surface, means for stopping said feeding means, and a control member for said feed stopping means mounted on said frame for engagement with said tape supply and adapted to be normally held by said tape suply in non-operating positions and to be released upon exhaustion of said tape supply for movement to a position operating said feeding means in response to exhaustion of said tape supply before the trailing end of said tape reaches said heater to maintain said tape between said pressure member and said heating surface and thus to prevent direct contact between said pressure member and heating surface and the resulting transfer of softened adhesive deposit from said heating surface to said pressure member.

14. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, a heater including a heating surface intermediate said tape supply and said application point, means for guiding said tape to said heating surface, pressure means for effecting heat exchanging contact between said coated surface of said tape and said heating surface to cause softening of said coating, a plurality of heater elements for said heater, means supporting said heating elements in heating relation with said heating surface, a thermosensitive switch controlling said heater elements to maintain the temperature of said heating surface within a desired range, indicating means connected with each said heating element, means for energizing each said indicating means through the heating element associated therewith when said switch is open to indicate the operativeness of said associated heater element, and means operated by said switch for short circuiting said indicating means when said switch is closed to energize said heater elements.

15. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, means for heating said tape to soften said coating thereon, means for feeding said heated tape to said application point, means for heating said feeding means to prevent deposit of said softening coating thereon, adjustable means for operating both of said heating means independently to establish and maintain desired temperature ranges at said heating surface and said feeding means, and indicating means associated with both of heating means for indicating independently the failure of either of said heating means.

16. Apparatus for applying tape having a thermoplastic adhesive coating from a continuous supply thereof to successive articles to be sealed, comprising a frame, means for supporting said tape supply on said frame, means for conveying successive articles to be sealed to a predetermined application point, means for feeding tape from said supply to said application point, means for heating said tape to soften said coating thereon, means for feeding said heated tape to said application point, means for heating said feeding means to prevent deposit of said softening coating thereon, separate circuits for energizing both of said heating means, a relay controlling each said circuit, a thermosensitive switch for operating each said relay, means supporting one of said switches adjacent each of said heating means, a hold-in circuit responsive to closing of each said relay to maintain the same in closed position, and means for periodically interrupting said hold-in circuit to effect opening of said relay following the opening of the switch associated therewith.

FREDERICK W. HOLT, Jr.
DAVID E. BENCH.
WALTER ERNST.

(References on following page)

REFERENCES CITED

The following references are of record in the file of this patent:

UNITED STATES PATENTS

| Number | Name | Date |
|---|---|---|
| 1,443,784 | Black | Jan. 30, 1923 |
| 1,588,037 | Liggett | June 8, 1926 |
| 1,740,844 | Strout | Dec. 24, 1926 |
| 1,829,286 | Long | Oct. 27, 1931 |
| 1,931,953 | Cameron | Oct. 24, 1933 |
| 2,082,114 | Littlefield | June 1, 1937 |
| 2,123,415 | Gorbatenko | July 12, 1938 |
| 2,248,744 | Cohen | July 8, 1941 |
| 2,362,413 | Shields | Nov. 7, 1944 |
| 2,449,298 | Hoppe | Sept. 14, 1948 |
| 2,467,275 | Shields | Apr. 12, 1949 |
| 2,538,520 | Holt et al. | Jan. 16, 1951 |

FOREIGN PATENTS

| Number | Country | Date |
|---|---|---|
| 424,068 | Great Britain | Feb. 14, 1935 |